US011324085B2

(12) United States Patent
Visser et al.

(10) Patent No.: US 11,324,085 B2
(45) Date of Patent: May 3, 2022

(54) ELECTRIC CURRENT SUPPLY SYSTEM, DESIGNED TO BE AT LEAST PARTIALLY SUBMERGED IN AN ELECTRICALLY CONDUCTIVE LIQUID DURING OPERATION THEREOF

(71) Applicant: KONINKLIJKE PHILIPS N.V., Eindhoven (NL)

(72) Inventors: Cornelis Gerardus Visser, Eindhoven (NL); Martinus Hermanus Wilhelmus Maria Van Delden, Venlo (NL)

(73) Assignee: Koninklijke Philips N.V., Eindhoven (NL)

( * ) Notice: Subject to any disclaimer, the term of this patent is extended or adjusted under 35 U.S.C. 154(b) by 188 days.

(21) Appl. No.: 16/759,405

(22) PCT Filed: Oct. 30, 2018

(86) PCT No.: PCT/EP2018/079613
§ 371 (c)(1),
(2) Date: Apr. 27, 2020

(87) PCT Pub. No.: WO2019/086396
PCT Pub. Date: May 9, 2019

(65) Prior Publication Data

US 2020/0325585 A1 Oct. 15, 2020

(30) Foreign Application Priority Data

Nov. 1, 2017 (EP) .................................... 17199529

(51) Int. Cl.
*B63B 1/38* (2006.01)
*H05B 45/00* (2022.01)
(Continued)

(52) U.S. Cl.
CPC ............... *H05B 45/00* (2020.01); *B63B 1/38* (2013.01); *C23F 13/06* (2013.01); *H01B 7/2813* (2013.01);
(Continued)

(58) Field of Classification Search
CPC .......... H01B 1/023; H01B 1/026; H01B 7/12; H01B 7/36; H01B 7/2813; H05B 45/37;
(Continued)

(56) References Cited

U.S. PATENT DOCUMENTS

| | | | |
|---|---|---|---|
| 4,772,344 | A | 9/1988 | Andoe |
| 5,009,757 | A | 4/1991 | Riffe et al. |

(Continued)

FOREIGN PATENT DOCUMENTS

| | | | |
|---|---|---|---|
| WO | 2014188347 | A1 | 11/2014 |
| WO | 2017108545 | A1 | 6/2017 |

OTHER PUBLICATIONS

International Search Report and Written Opinion from PCT/EP2018/079613 dated Nov. 29, 2018.

*Primary Examiner* — William H. Mayo, III

(57) ABSTRACT

An electric current supply system (20) is designed to be at least partially submerged in an electrically conductive liquid during operation thereof, and having at least one electrically conductive component (21, 22, 23, 24) enveloped in liquid-tight material (40). The component (21, 22, 23, 24) has a sacrificial material that is capable of reacting electrochemically with the liquid. Further, the component (21, 22, 23, 24) has at least one gas trap portion (50) at which the sacrificial material occupies a space in the liquid-tight material (40) that is thereby defined with a gas trapping shape. If, in case of damage to the system (20) in an actual submerged state thereof, the component (21, 22, 23, 24) gets exposed to the liquid, it is achieved that an electrochemical reaction occur-
(Continued)

ring at the exposed area of the component (21, 22, 23, 24) and an outflow of electric current to the liquid are stopped.

15 Claims, 4 Drawing Sheets

(51) Int. Cl.

| | |
|---|---|
| ***C23F 13/06*** | (2006.01) |
| ***H01B 17/36*** | (2006.01) |
| ***H01B 7/28*** | (2006.01) |
| *B63B 59/04* | (2006.01) |
| *H01B 1/02* | (2006.01) |
| *H01B 7/12* | (2006.01) |
| *B63B 59/06* | (2006.01) |
| *B63B 59/08* | (2006.01) |

(52) U.S. Cl.
CPC .............. *H01B 17/36* (2013.01); *B63B 59/04* (2013.01); *B63B 59/045* (2013.01); *B63B 59/06* (2013.01); *B63B 59/08* (2013.01); *H01B 1/023* (2013.01); *H01B 1/026* (2013.01); *H01B 7/12* (2013.01)

(58) Field of Classification Search
CPC ......... H05B 45/40; H05B 45/00; C23F 13/06; C02F 1/467; C09D 5/1693; B63B 1/38; B63B 59/04; B63B 59/045; B63B 59/06; B63B 59/08
See application file for complete search history.

(56) References Cited

U.S. PATENT DOCUMENTS

| | | | | | |
|---|---|---|---|---|---|
| 5,088,432 | A * | 2/1992 | Usami | B63B 59/04 | 204/196.3 |
| 5,552,656 | A * | 9/1996 | Taylor | B63B 59/04 | 310/317 |
| 5,643,424 | A * | 7/1997 | Riffe | B08B 17/02 | 204/196.05 |
| 5,820,737 | A * | 10/1998 | Kohn | B63B 59/04 | 204/196.3 |
| 6,197,168 | B1 | 3/2001 | Matsunaga et al. | | |
| 7,111,428 | B1 * | 9/2006 | Ostlie | A01M 21/046 | 43/124 |
| 9,209,674 | B2 * | 12/2015 | Spinella | H02J 7/007 | |
| 9,585,205 | B2 * | 2/2017 | De Samber | H05B 45/00 | |
| 9,611,016 | B2 * | 4/2017 | Salters | B08B 7/0057 | |
| 11,006,498 | B2 * | 5/2021 | Van Delden | H05B 45/37 | |
| 2004/0112762 | A1 | 6/2004 | Wilms et al. | | |
| 2014/0060884 | A1 | 3/2014 | Patel | | |
| 2014/0331912 | A1 * | 11/2014 | Wu | B63B 1/38 | 114/67 A |
| 2017/0197693 | A1 | 7/2017 | Salters et al. | | |

* cited by examiner

ELECTRIC CURRENT SUPPLY SYSTEM, DESIGNED TO BE AT LEAST PARTIALLY SUBMERGED IN AN ELECTRICALLY CONDUCTIVE LIQUID DURING OPERATION THEREOF

CROSS REFERENCE TO RELATED APPLICATIONS

This application is a U.S. national phase application of International Application No. PCT/EP2018/079613 filed on Oct. 30, 2018, which claims the benefit of EP Application Serial No. 17199529.3 filed on Nov. 1, 2017 and are incorporated herein by reference.

FIELD OF THE INVENTION

The invention relates to an electric current supply system, designed to be at least partially submerged in an electrically conductive liquid during operation thereof, and comprising at least one electrically conductive component enveloped in liquid-tight material. The invention also relates to an electric device, designed to be at least partially submerged in an electrically conductive liquid during operation thereof, and comprising an electric current supply system as mentioned and at least one electric load connected to the at least one electrically conductive component of the electric current supply system. Another subject of the invention is an assembly of a marine object and the electric device as mentioned, the marine object comprising at least one surface that is intended to be at least partially submersed in water containing biofouling organisms during at least a part of the lifetime of the marine object, and the electric device being arranged on the at least one surface.

Further, the invention relates to a method of manufacturing an electric current supply system that is to be at least partially submerged in an electrically conductive liquid and that comprises at least one electrically conductive component enveloped in liquid-tight material.

Still further, the invention relates to a method of reducing an outflow of electric current from an electric device comprising an electric current supply system and an electric power source, the electric current supply system comprising at least one electrically conductive component connected to the electric power source and enveloped in liquid-tight material, the outflow of electric current from the electric device occurring in the event that the electric current supply system is at least partially submerged in an electrically conductive liquid and the liquid-tight material is damaged so that the liquid is allowed to reach the at least one electrically conductive component.

BACKGROUND OF THE INVENTION

In the field of electric current supply systems that are intended to be used in an underwater environment, it is very important for the electrically conductive components of such systems to be electrically insulated from the liquid/water. In view thereof, it is common practice for such systems to comprise liquid-tight material, wherein the electrically conductive components are enveloped in such material. For example, an electric current supply system may comprise a housing made of liquid-tight material in which the electrically conductive components are accommodated. According to another option, the electrically conductive components may be embedded in a liquid-tight material. In this respect, it is noted that WO 2014/188347 A1 discloses a lighting module for anti-fouling of a protected surface such as the hull of a ship, comprising at least one light source for generating an anti-fouling light and an optical medium for distributing at least part of the anti-fouling light through the optical medium. During operation of the lighting module known from WO 2014/188347 A1, anti-fouling of a protected surface is achieved on the basis of emission of the anti-fouling light that is generated from the optical medium, in a direction away from the surface. In general, the solution to biofouling that is embodied in the known lighting module is based on UV radiation, particularly UV-C radiation, and is effective when it comes to preventing (initial) settlement of biofouling organisms on the surface, i.e. formation of a biofilm on the surface. An aspect of biofilms that causes problems in the context of a ship's hull is that as their thickness increases over time due to settlement and growth of biofouling organisms, the exterior surface of the ship's hull roughens, as a result of which drag increases, involving an increase of fuel consumption and thus an increase of operational costs.

WO 2014/188347 A1 discloses that a solution to counter biofouling of a ship's hull can be the coverage of the exterior of the hull with lighting modules comprising slabs of UV-C transparent material having embedded UV-C LEDs. The lighting modules are intended to be located below the waterline as biofouling occurs in the water. In order to operate the lighting modules, electric power needs to be delivered under the waterline. The combination of electricity, water, and the rough and tough environment of the off-shore industry poses a real challenge. The fact is that (sea)water is a good electric conductor, as a result of which there is an actual risk that short circuits may arise. Ship's hulls are known to get (severely) damaged over life, for example due to collisions with float wood or other close or near to the waterline floating objects, or they may suffer from impacts due to collisions with other ships. When a ship's hull is at least partially covered with lighting modules as described in the foregoing, it is likely that the lighting modules get damaged over life as well as the power supply lines. If, for example, a power supply line is cut, a situation in which an electric circuit is exposed to seawater is obtained. In that situation, electric power is dumped into the seawater at the position of the cut, so that power supply to one or more lighting modules that are dependent on the power supply line fails.

The possibility of a power supply line getting cut in an underwater environment and a loss of electric power to the seawater occurring as a result thereof is addressed in WO 2017/108545 A1. Among other things, WO 2017/108545 A1 teaches that the amount of power dumped into the seawater and the time that such process takes place can be minimized by optimizing physical dimensions of the power supply line and making an appropriate choice of material of the power supply line, such that the area of the power supply line that is exposed to the seawater will quickly dissolve as a result of an electrochemical process taking place at the interface of the seawater and the power supply line.

SUMMARY OF THE INVENTION

As suggested earlier, the invention is in the field of underwater electric current supply systems comprising at least one electrically conductive component enveloped in liquid-tight material, particularly systems that are intended to be used in an environment of electrically conductive liquid. It is an object of the invention to not simply rely on the known concept of designing an electrically conductive component that is to be located in such an environment, and that may end up being unintendedly exposed to the liquid, in such a way that it is capable of dissolving under the influence of electrochemical effects, for the purpose of taking measures aimed at terminating a process in which electric power is lost to the environment in case of damage. The invention is aimed at providing a possibility of terminating such process in a well-defined way, preferably in a passive way, i.e. without needing to initiate some additional action. The fact is that for various reasons, it is desirable to put an end to such process as soon as possible after it is initiated. One reason is that if the electric current supply system is located on an area of a ship's hull, for example, or a ship's propeller or the like, oxidation and reduction of the material of the nearby/underlying area may take place in the process. Another reason is that when an electric load that is arranged to be powered by means of the system receives insufficient power, this may cause damage to the electric load.

In view of the foregoing, the invention provides an electric current supply system, designed to be at least partially submerged in an electrically conductive liquid during operation thereof, and comprising at least one electrically conductive component enveloped in liquid-tight material, wherein the at least one electrically conductive component comprises sacrificial material that is capable of reacting electrochemically with the liquid in the event that the liquid-tight material is damaged and the liquid is allowed to reach the at least one electrically conductive component, and wherein the at least one electrically conductive component comprises at least one portion at which the sacrificial material occupies a space in the liquid-tight material that is thereby defined with a shape that is designed for trapping gas that is generated in the said event as the sacrificial material of the at least one electrically conductive component disappears at the position where the sacrificial material reacts electrochemically with the liquid.

In the electric current supply system according to the invention, the at least one electrically conductive component is designed so as to have a possibility of controlling termination of electrochemical dissolution of the material of the electrically conductive component as may be expected to take place when the electrically conductive component is exposed to water in case of damage of the system. In particular, the at least one electrically conductive component is shaped such as to have at least one well-defined position in the system where a dissolution process of the component is made to stop. In that way, when damage occurs, it is not only possible to achieve that a dumping process of electric power to the water is automatically terminated at a certain point, but also that a dissolution process of the at least one electrically conductive component cannot continue all the way to at least one electric load connected to the electrically conductive component, for example, which would otherwise cause the electric load to be exposed to the water in the end, and/or cannot continue all the way to a junction of electrically conductive components, which would otherwise cause failure of power supply through other electrically conductive components as well.

The working principle according to the invention is as follows. When a situation of damage occurs in which the at least one electrically conductive component is exposed to the electrically conductive liquid of the environment of the electric current supply system, the sacrificial material of the component and the liquid interact with each other under the influence of the supply of electric current through the component. The sacrificial material of the component and the liquid get involved in an electrochemical process in which the sacrificial material of the component is made to dissolve. Assuming a generally elongated shape of the component, particularly a wire shape, the sacrificial material of the component may be expected to retract in one direction from a position of damage in the case of DC (Direct Current) electric power supply, and to retract in two directions from a position of damage in the case of AC (Alternating Current) electric power supply. Another effect of the electrochemical process is the formation of a gas. The invention is based on the insight that the gas can be used as electrical insulation between the component and the liquid, combined with the insight that the design of at least one portion of the component can be chosen such that the space it leaves behind in the liquid-tight material as it dissolves is suitable for trapping the gas.

It follows from the foregoing that when the invention is applied, an electric current supply system is obtained in which, in case the at least one electrically conductive component thereof gets exposed to electrically conductive liquid of the environment of the system, the component dissolves under the influence of an electrochemical reaction that occurs at that point, wherein the component retracts in the liquid-tight material, at least in one direction, whereby space is formed in the liquid-tight material. According to a notable feature of the invention, the shape of at least a portion of the component is chosen such that the space that is formed is capable of trapping gas that is generated in the actual process of an electrochemical reaction. Gas that gets trapped is used as electrical insulation between the component and the liquid so that the electrochemical reaction and a dumping of electric power to the environment can be put to a hold. In that way, it is achieved that there is no need for cutting off the supply of electric power in the system. On the contrary, as long as it is desirable to operate the system, the supply of electric power should be continued under all circumstances, wherein it is a practical possibility to limit the power supply as long as a process of at least one component dissolving and gas insulation building up takes place, which may be done by applying commonly known measures for limiting short circuit currents, for example. The invention envisages an automatic formation of gas plugs, as it were, at appropriate positions in the system as soon as a dumping process of electric power to the environment takes place, so that the dumping is stopped and operation of the system can be continued in an optimal manner. In case at least one electric load to be powered by means of the system can be reached through an alternative route than only through the component that has failed, it may even be so that the at least one load can still be used. An advantageous aspect of the invention is that should trapped gas be lost for some reason, a new quantity of gas is generated and trapped as soon as the component is contacted by the liquid in that situation.

It is not necessary for the at least one electrically conductive component to be entirely made of material that is suitable for generating gas when being involved in an electrochemical reaction. For example, an embodiment of the electric current supply system according to the invention is feasible in which the material with the ability to generate gas is arranged so as to form an outer sleeve of the at least one electrically conductive component as it were, along an entire length of the at least one electrically conductive component or only along parts of the length, in a position for at least partially surrounding other material of the at least one electrically conductive component.

Examples of the electrically conductive liquid in which the electric current supply system is to be at least partially submerged include aqueous liquids such as water, seawater, and water in which a salt such as chlorine salt is dissolved. Examples of the material as may be comprised by the at least one electrically conductive component include aluminum, copper, iron, zinc and metal alloys.

In a practical embodiment of the electric current supply system according to the invention, the at least one electrically conductive component may be expected to have a generally elongated shape. For example, the at least one electrically conductive component may be shaped like a wire or an elongated strip. In such a case, it may be advantageous for the at least one electrically conductive component to comprise at least one gas trap portion that is at least partially loop-shaped. In case of damage and an associated dissolving process of the component, the space that is obtained in the liquid-tight material as a result thereof is formed with at least one portion that is at least partially loop-shaped. The design can particularly be aimed at having the loop or the partial loop in an upright position in an operational position of the electric current supply system, so that gas will be trapped at a top position of the loop or the partial loop, assuming that the gas can normally be expected to rise. In this respect, it is noted that it may be advantageous for the electric current supply system and/or a larger electric device of which the electric current supply system may be part to be provided with markings so as to enable correct mounting, i.e. mounting in which an effective orientation of the at least one gas trap portion of the at least one electrically conductive component is obtained. It is also possible for the at least one electrically conductive component to comprise various gas trap portions having different orientations, preferably such that it may be guaranteed that regardless the orientation of the electric current supply system, there is always a gas trap portion that is in a position for actually trapping gas.

Assuming that the at least one electrically conductive component has a generally elongated shape and comprises at least one gas trap portion as mentioned, it may further be practical for the component to have a superimposed bent shape at the position of the at least one gas trap portion. In other words, it may in principle be so that the gas trap portion, seen in a larger perspective, has a more or less planar appearance, but it is also very well possible that the gas trap portion as a whole, i.e. the gas trap portion with the one or more loops or partial loops, is bent. The superimposed bent shape may contribute to the component's ability of trapping gas and/or may allow for arrangement of the component on uneven and/or bent surfaces at the position of the gas trap portion.

In case the at least one electrically conductive component comprises at least one gas trap portion, as mentioned, it may be so that the gas trap portion comprises a plurality of loops. In particular, the gas trap portion may be a coil-shaped portion.

One possible field of application of the invention is the field of lighting modules comprising slabs of UV-C transparent material having embedded UV-C LEDs, as mentioned in the foregoing with reference to WO 2014/188347 A1. In view thereof, it may be desirable for the electric current supply system according to the invention to be of a generally flat shape, and for a thickness of the system to be in a range of 1 to 2 mm. Such a flat appearance of the system according to the invention may be advantageous in other contexts as well.

Optionally, the electric current supply system according to the invention is equipped with material that is made to swell as soon as it gets wet. Having such material at strategic positions in the system, which may be positions near the at least one portion of the electrically conductive component that is designed to leave behind a space in the liquid-tight material that is suitable for trapping gas should it dissolve, contributes to terminating a possible dumping process of electric current to the environment as quickly as possible.

Another subject of the invention is an electric device, designed to be at least partially submerged in an electrically conductive liquid during operation thereof, and comprising an electric current supply system as mentioned in the foregoing and at least one electric load connected to the at least one electrically conductive component of the electric current supply system. The at least one electric load may be embodied in any practical and appropriate way. For example, the at least one electric load may comprise a light source that is configured to generate anti-fouling light, as mentioned earlier, such as a UV-C LED. In any case, the electric device according to the invention may further comprise an electric power source connected to the at least one electrically conductive component of the electric current supply system. When the electric device is operated, the electric power source functions to input electric power to the electric current supply system, and the electric current supply system functions to supply electric current to the at least one electric load.

The invention further relates to an assembly of a marine object and the electric device as mentioned in the foregoing, the marine object comprising at least one surface that is intended to be at least partially submersed in water containing biofouling organisms during at least a part of the lifetime of the marine object, and the electric device being arranged on the at least one surface. In the context of the present text, the term "marine object" is not limited to objects for use in seawater, but is to be understood so as to include objects for use in any type of water that is known to contain biofouling organisms and to have electrically conductive properties. Examples of marine objects include ships and other vessels, marine stations, sea-based oil or gas installations, buoyancy devices, support structures for wind turbines at sea, structures for harvesting wave/tidal energy, sea chests, underwater tools, etc. A marine object is only one example of the many objects that may be equipped with the electric device according to the invention.

Still further, the invention relates to a method of manufacturing an electric current supply system that is to be at least partially submerged in an electrically conductive liquid and that comprises at least one electrically conductive component enveloped in liquid-tight material, the at least one electrically conductive component comprising sacrificial material that is capable of reacting electrochemically with the liquid in the event that the liquid-tight material is damaged and the liquid is allowed to reach the at least one electrically conductive component, and the method comprising providing the at least one electrically conductive component with at least one gas trap portion at which the sacrificial material of the at least one electrically conductive component is configured to occupy a space in the liquid-tight material that is thereby defined with a shape that is designed for trapping gas that is generated in the said event as the sacrificial material of the at least one electrically conductive component disappears at the position where the sacrificial material reacts electrochemically with the liquid, and enveloping the at least one electrically conductive component in the liquid-tight material. In conformity with what has already been explained in the foregoing, it is noted that by putting the method according to the invention to practice, an electric current supply system is obtained that is capable of automatically forming a kind of gas plugs for preventing an outflow of electric current from the system to an environmental electrically conductive liquid at predetermined positions in the system in case of damage.

Optional aspects of the method correspond to optional aspects of the electric current supply system. In the first place, it may be so that the at least one electrically conductive component is locally deformed prior to being enveloped in the liquid-tight material. Further, it may be so that the at least one electrically conductive component has a generally elongated shape, and that the at least one electrically conductive component is provided with at least one gas trap portion that is at least partially loop-shaped by locally subjecting the at least one electrically conductive component to a bending action. In this respect, it is noted that the at least one electrically conductive component may be subjected to a further bending action at the position of the at least one gas trap portion for realizing a superimposed bent shape of the at least one electrically conductive component at the position of the at least one gas trap portion. Also, as mentioned earlier, in case the at least one electrically conductive component is provided with at least one gas trap portion, it may be so that the gas trap portion is realized with a plurality of loops, wherein the gas trap portion may be a coil-shaped portion.

For the purpose of forming the at least one gas trap portion in the at least one electrically conductive component, an aid in the form of a core element may be used, in which case the at least one gas trap portion is formed by wrapping a part of the component around the core element, after which the core element is removed from the at least one electrically conductive component. For example, for the purpose of providing the component with a coil-shaped portion, an elongated core element may be used, wherein a part of the component is wrapped around the core element so as to make successive windings upon the core element.

The invention also relates to a method of reducing an outflow of electric current from an electric device comprising an electric current supply system and an electric power source, the electric current supply system comprising at least one electrically conductive component connected to the electric power source and enveloped in liquid-tight material, the outflow of electric current from the electric device occurring in the event that the electric current supply system is at least partially submerged in an electrically conductive liquid and the liquid-tight material is damaged so that the liquid is allowed to reach the at least one electrically conductive component, the at least one electrically conductive component comprising sacrificial material that is capable of reacting electrochemically with the liquid, and the method comprising: enabling an electrochemical reaction of the sacrificial material of the at least one electrically conductive component with the liquid by continuing a supply of electric current from the electric power source to the at least one electrically conductive component, and trapping gas that is generated in the electrochemical reaction in a space that is obtained in the liquid-tight material as the sacrificial material of the at least one electrically conductive component disappears at the position where the electrochemical reaction takes place. As explained earlier, the invention aims at realizing automatic termination of a situation in which electric current is dumped to an environmental electrically conductive liquid in case the at least one electrically component gets exposed to the liquid due to damage to the electric current supply system, wherein clever use is made of the gas formation effect of an electrochemical reaction between the component and the liquid, namely by trapping the gas at a position for insulating the component from the liquid.

The above-described and other aspects of the invention will be apparent from and elucidated with reference to the following detailed description of various practical options relating to an electric current supply system designed for use in an electric device that further comprises electric loads that are to be powered by means of the system.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
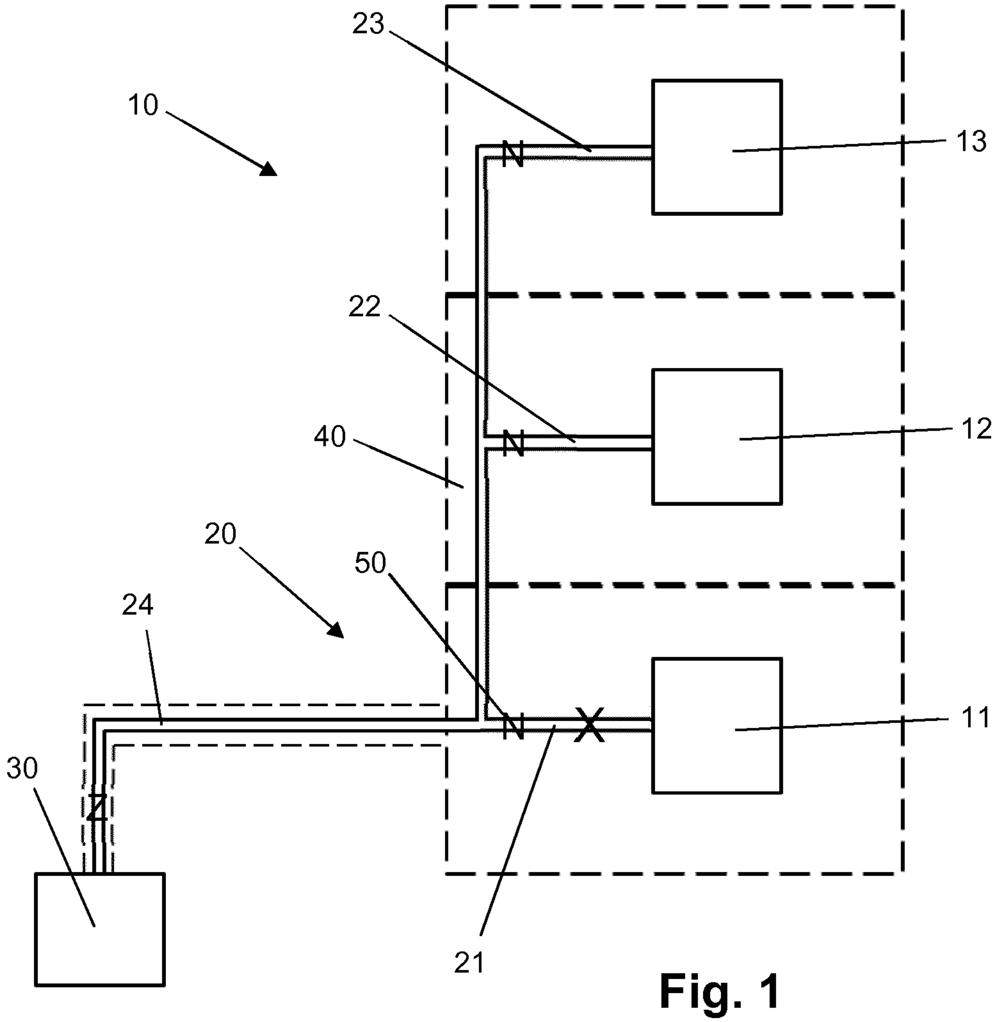
FIG. 1 is a schematic representation of an electric device comprising a number of electric loads and an electric current supply system for powering the electric loads.

FIG. 1 provides a schematic representation of an electric device 10 comprising a number of electric loads 11, 12, 13 and an electric current supply system 20 for powering the electric loads 11, 12, 13. The number of electric loads 11, 12, 13 shown in the figure is three, which is an arbitrary number within the framework of the invention. The electric device 10 is intended to be used underwater, and may for example be arranged on a ship's hull so as to cover an area of the ship's hull. The electric loads 11, 12, 13 may be UV-C LEDs, for example, in which case the electric device 10 is suitable to be used for anti-fouling purposes, i.e. for subjecting the protected area to an anti-fouling action on the basis of which a clean appearance of the area is obtained/maintained. However, it is to be noted that the invention is not at all restricted to the field of anti-fouling, and that the present description of various aspects of the electric device 10 is equally applicable to other possible applications of the invention.

The electric current supply system 20 comprises electrically conductive wiring, including one supply wire 21, 22, 23 per electric load 11, 12, 13 and a common supply wire 24. The common supply wire 24 is connected to an electric power source 30. In the following, the entire arrangement of the electrically conductive wiring and the electric loads 11, 12, 13 will be referred to as the electric circuit of the electric device 10. Each of the electric loads 11, 12, 13 and the associated supply wire 21, 22, 23 is embedded in a slab of liquid-tight material 40 such as silicone. The common supply wire 24 is surrounded by a layer of liquid-tight material 40 as well, so that the electric circuit of the electric device 10 cannot be reached by the liquid in which the electric device 10 is to be submerged during use, which may be seawater. That is to say, the electric circuit of the electric device 10 cannot be reached by the liquid under normal circumstances. However, if the electric device 10 is used underwater and damage to the electric device 10 occurs, it may happen that the liquid-tight protection of the electric circuit is no longer closed and the electric circuit is exposed to the liquid.

According to the invention, the electrically conductive wiring comprises sacrificial material that is capable of reacting electrochemically with the liquid. In case the liquid is seawater, a suitable material is copper or aluminum. Also, the electrically conductive wiring comprises gas trap portions at appropriate positions as will be further explained in the following. In FIG. 1, each one of respective gas trap portions is indicated by reference numeral 50.

With reference to FIG. 1, it is noted that it is assumed that damage occurs at a position X on a supply wire 21 associated with an electric load 11, particularly damage to the liquid tight material 40 and possibly also the supply wire 21, that causes the supply wire 21 to be reached by the environmental liquid. As soon as that happens, the electric current supplied by the power source 30 chooses the path of least resistance and is output to the environment. As a result, the current supply to the other electric loads 12, 13 is minimized or stopped, even though the supply wires 22, 23 associated with those electric loads 12, 13 are intact. Hence, not only does the supply of current to the electric load 11 associated with the damaged area of the electric device 10 fail, but the supply of current to the other electric loads 12, 13 is disturbed as well.

Under the influence of the electric current that flows to the environment through the damaged supply wire 21, an electrochemical reaction takes place at the position where an area of the supply wire 21 is contacted by the liquid. This causes the sacrificial material of the supply wire 21 to dissolve and also gas to be formed. In case of DC current supply, the supply wire 21 disappears in one direction from the damage position X, whereas in case of AC current supply, the supply wire 21 disappears in two directions from the damage position X. In the following, DC current supply and the associated dissolving process of the supply wire 21 in only one direction are assumed.

Depending on the direction of the current, i.e. on whether a negative voltage or a positive voltage is applied, the material of the supply wire 21 and/or the type of liquid in which the electric device 10 is submerged, one or more types of gas are formed in the electrochemical reaction. When the liquid is seawater, $Cl^-$ ions are present in the liquid, and $Cl_2$ gas may be formed at the anode constituted by a portion of the supply wire 21 having a positive potential under the influence of an applied current or voltage. Also, $O_2$ gas may be formed depending on the applied voltage, current strength, further ions present and the acidity of the liquid locally present at the anode. If the material of the supply wire 21 is copper, $Cu^{2+}$ ions may be obtained in the process, dissolving the supply wire 21. Also, $H_2$ gas may be formed under the influence of the same current at the cathode constituted by another portion of the supply wire 21, particularly a portion having a negative potential. In any case, the electrochemical process continues until the supply wire 21 has disappeared all the way to a gas trap portion 50.

The fact is that when the supply wire 21 dissolves, an elongated hollow cavity remains in the liquid-tight material 40 at the position where the material of the supply wire 21 used to be. A gas trap portion 50 is a portion of the wiring that is shaped in such a way that as the material of the wiring disappears and gas is formed, the gas is trapped in the space that is created in the liquid-tight material 40. The formation process of the elongated hollow cavity already contributes to limiting the amount of electric current that is lost to the environment, as the process causes the effective resistance of the liquid in the cavity to increase. As soon as gas gets trapped, the remainder of the supply wire 21 and the liquid are actually insulated from each other, as a result of which the electrochemical reaction is stopped and there is no longer a situation in which electric current is dumped to the environment. At that point, the supply of electric current to the other supply wires 22, 23 and the associated electric loads 12, 13 is restored so that the electric loads 12, 13 can function normally again. It may even be so that the electric load 11 associated with the damaged supply wire 21 is powered again as well, namely in case that electric load 11 is arranged so as to be redundantly powered through at least one of the other electric loads 12, 13, for example.

It follows from the foregoing that when damage to the electric device 10 occurs, to such an extent that the wiring gets exposed to the surrounding liquid, a process of dumping of electric current to the liquid is terminated automatically and functioning of the electric device 10 is restored in an optimal manner. As an additional measure, a general limitation of the electric current may be realized in any suitable manner known per se, as normally applied in order to avoid problems in short circuit situations. As long as the dumping of electric current lasts and the electrochemical reaction between the material of the wiring and the liquid takes place, damage to components in the immediate environment of the electric device 10 may occur as well. This is an important reason why it is advantageous to take measures to put an end to those damage-related processes. Also, it may be so that the electric loads 11, 12, 13 are of such a nature that they are susceptible to failure when the level of the current supply is lower than the level at which the electric loads 11, 12, 13 should normally be operated.

Within the framework of the invention, the wires 21, 22, 23, 24 making up the electrically conductive wiring of the electric device 10 may have any appropriate shape. In general, it is practical and advantageous for the wires 21, 22, 23, 24 to be elongated. However, the cross-sectional shape of the wires 21, 22, 23, 24 may be chosen such as to be optimal to the intended use and functionality. The wires 21, 22, 23, 24 may be conventional wires having a substantially circular cross-section, but it is also possible for the wires 21, 22, 23, 24 to be relatively flat strips having a rectangular cross-section, for example. The wires 21, 22, 23, 24 may comprise different portions having different cross-sectional shapes.

At the position of the gas trap portions 50, the wiring may have any shape that is suitable for trapping gas that appears at the interface of the wiring and the liquid when an electrochemical process takes place. FIGS. 2-11 relate to a number of the numerous possibilities covered by the invention. In general, it is practical for the gas trap portions 50 to comprise one or more loops or partial loops for forming a space having one or more loops/bends in the liquid-tight material 40 should it happen that the wiring dissolves, particularly loops or partial loops going in a direction that is an upright direction in a normal, operational position of the electric current supply system 20, which should not be understood so as to mean that the invention is limited to such general option.

Figure 2:
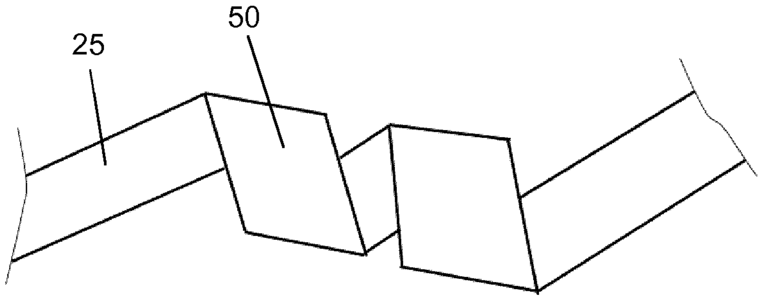
FIG. 2 illustrates a first possible design of a gas trap portion of an electrically conductive strip of the electric current supply system.
Figure 3:
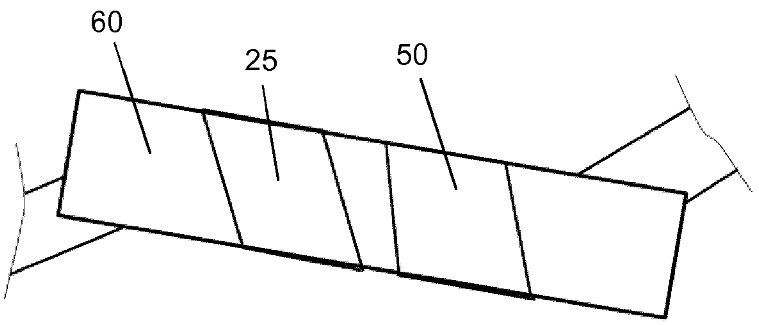
FIG. 3 illustrates a step in a process of realizing the gas trap portion in the electrically conductive strip.

In FIG. 2, a first possible design of a gas trap portion 50 is illustrated, wherein the gas trap portion 50 is shown as being part of an electrically conductive strip 25. In this example, the gas trap portion 50 is shaped as a coil-shaped portion of the strip 25. During the manufacturing process of the electric current supply system 20, such a gas trap portion 50 may be realized in the strip 25 simply by wrapping a portion of the strip 25 around a core element 60, as illustrated in FIG. 3, and subsequently removing the core element 60. Naturally, this is done prior to enveloping the strip 25 in the liquid-tight material 40. When the strip 25 comprises a metal such as copper or aluminum, the strip 25 is very well capable of maintaining its locally deformed shape. The gas trap portion 50 as shown leaves behind a coil-shaped space in the liquid-tight material 40 should it happen that the material of the strip 25 dissolves. Gas that is obtained in the electrochemical process taking place at that time gets trapped at a top side of at least one of the windings of the coil-shaped space.

Figure 4:
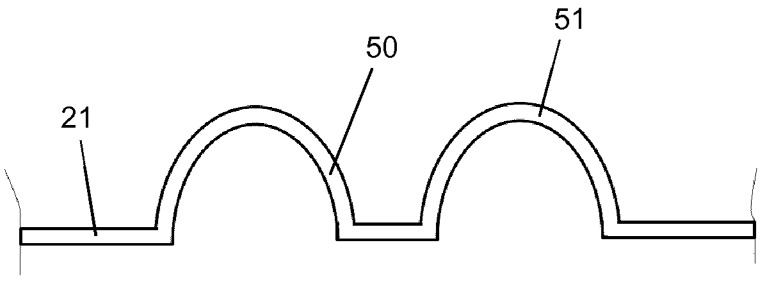
FIGS. 4-11 illustrate other possible designs of a gas trap portion of an electrically conductive wire of the electric current supply system.

In FIG. 4, a second possible design of a gas trap portion 50 is illustrated, wherein the gas trap portion 50 is shown as being part of an electrically conductive wire 21. In this example, at the position of the gas trap portion 50, the wire 21 is bent such that two U-shaped partial loops 51 are located in the wire 21, the bottom side of the U being located at the top. The gas trap portion 50 as shown leaves behind a corrugated space in the liquid-tight material 40 should it happen that the material of the strip 25 dissolves. Gas that is obtained in the electrochemical process taking place at that time, gets trapped at a top side of at least one U-shaped partial loop of the space.

Figure 5:
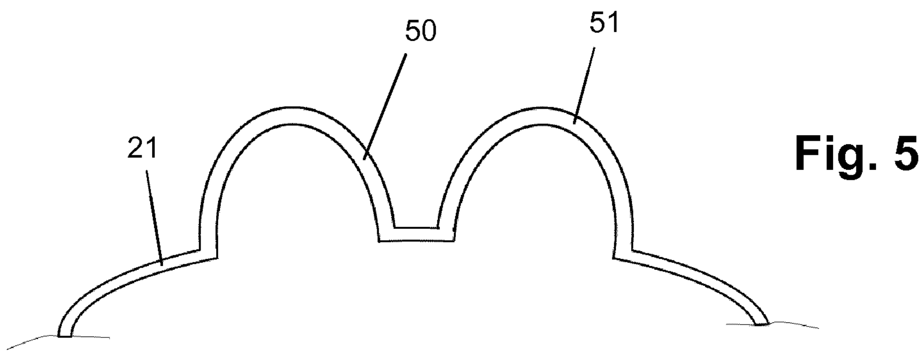
Figure 6:
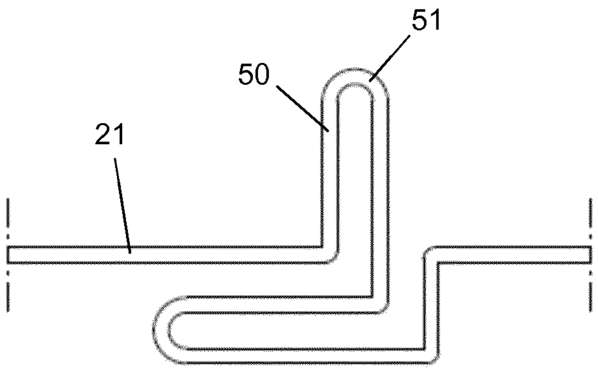
Figure 7:
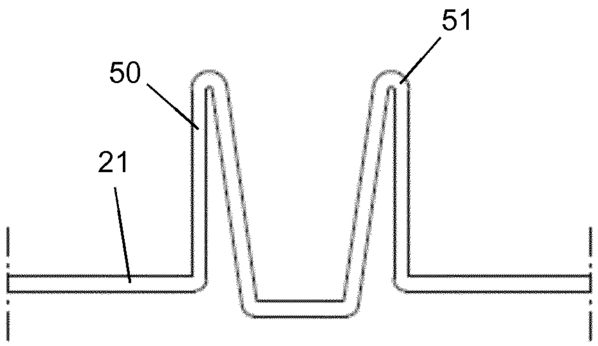
Figure 8:
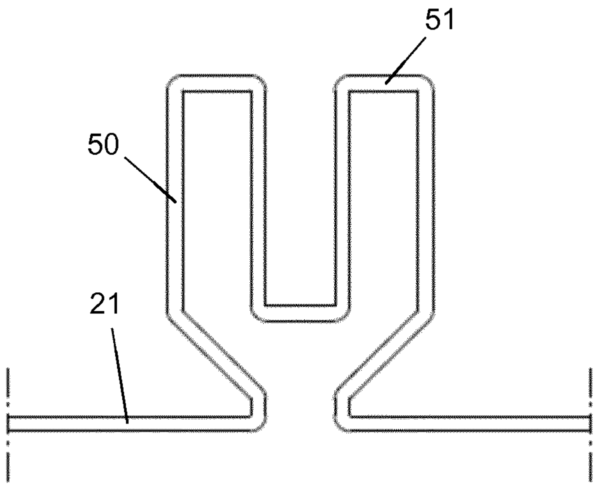
Figure 9:
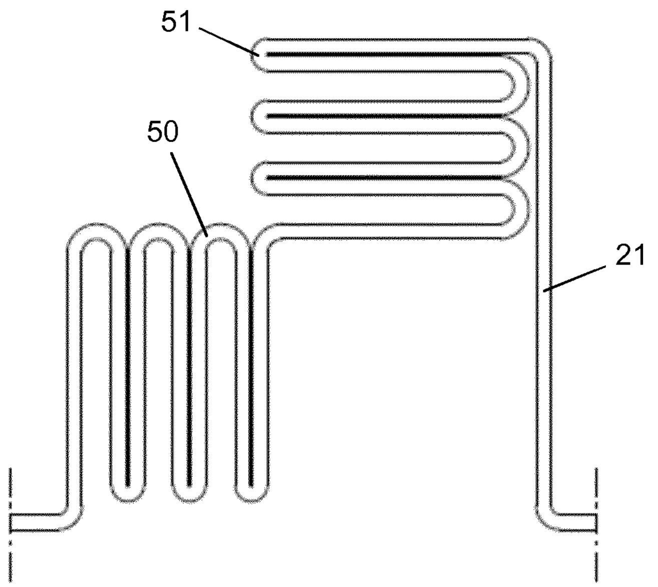
Figure 10:
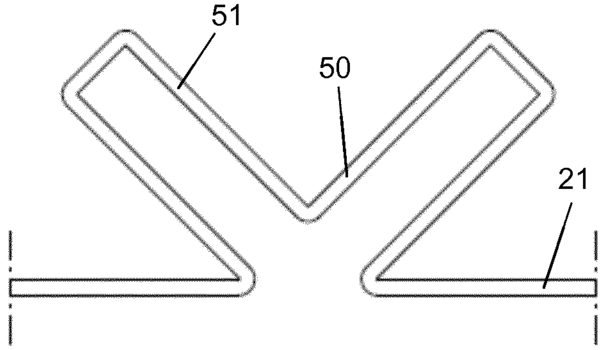
Figure 11:
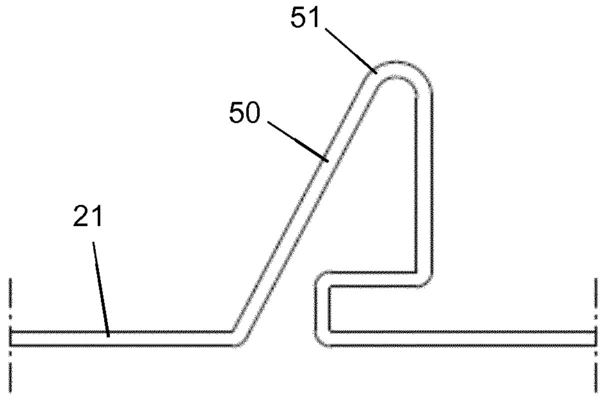

FIG. 5 serves to illustrate the fact that it is possible for the gas trap portion 50 to not only comprise bent portions of an electrically conductive component, but also to be bent itself, in other words, for the electrically conductive component to have a superimposed bent shape at the position of the gas trap portion 50. In FIG. 5, it is shown how a gas trap portion 50 as shown in FIG. 4 is bent in its entirety. The superimposed bent shape may be realized for the purpose of enhancing the gas trapping effect of a certain gas trap portion 50 and/or for the purpose of allowing the gas trap portion 50 to follow a given supporting surface and/or bridging a certain area of a supporting surface, for example.

The examples shown in FIGS. 2, 4 and 5 only serve to illustrate the invention, wherein it is noted once again that numerous possibilities exist within the framework of the invention when it comes to the design of the gas trap portions 50. The gas trap portion 50 may as well have an S-shaped appearance, to mention one other possibility of realizing a shape having loops or partial loops, or may be provided as a flat execution mounted on a surface that is folded so as to yield a gas trap. Examples of other possibilities are diagrammatically shown in FIGS. 6-11. In general, the gas trap portion 50 may be shaped so as to have parts in each one of an x direction, a y direction and a z direction. The electric current supply system 20 may be provided with as many gas trap portions 50 as desirable in a given case, wherein the gas trap portions 50 may have any suitable positioning in the system 20.

The functionality of the invention has been experimentally validated. In particular, an electric system comprising a copper or aluminum strip and silicone material enveloping the strip was tested, the strip having a shape as shown in FIG. 2, i.e. a strip that is provided with a coil-shaped gas trap portion. The entirety of the strip and the liquid-tight material was designed as a kind of tile with only very limited height, namely a height of about 2 mm. The strip was connected to an electric power source, and the short circuit current was set to be 4.00 Ampere. The associated voltage over the strip was 0.22 Volt. The entirety of the strip and the liquid-tight material was placed in salt water of 35 g salt per liter water.

Once everything was set as indicated, a cut having a width of 1 mm was made all the way through both the strip and the liquid-tight material. As a result, the formerly enveloped material of the strip got exposed to the salt water. In that situation, electric current flowed along a length of at least 1 mm through the salt water, at a value of 4.00 Ampere. In the case of the copper strip, it appeared that the water turned green, which is an indication of a dissolution process of copper, and in the case of the aluminum strip, it appeared that the water turned whitish, which is an indication of a dissolution process of aluminum. In both cases, the value of the electric current decreased to 0.01 Ampere, while the voltage increased to 12.3 Volt. Thus, it appeared that without any human intervention, as a result of the electrochemical deterioration/corrosion of the strip, leakage of electric current to the salt water was stopped.

As already mentioned in the foregoing, one of the possible applications of the invention is an application in the field of UV-C LED tiles as may be used on a ship's hull. When or more powered connections at the ship's hull, providing power to/in the UV-C LED tiles are cut or get otherwise damaged, seawater and electricity will meet. As a result, electrochemistry will occur, involving the oxidation and reduction of the ship's hull, possibly also the ship's propeller, and the powerline. Hence, one or more of these will dissolve under the influence of the electric current. Also, as long as the electrochemical process lasts, it may be so that the UV-C LED tiles receive insufficient power and/or get also damaged. The invention provides a mechanism according to which an outflow of electric current to the seawater can be stopped, or at least be significantly reduced, so that damage to the ship and the UV-C LED tiles is kept to a minimum or does not even occur at all.

In one embodiment of the invention, a thin-sheet metal foil such as a copper foil is cut to a strip and wound around a beam-shaped liner. In this way, a thin-film spiral is realized extending in all three of the x direction, the y direction and the z direction. In order to allow for underwater use of the strip as a power supply line, the strip is enveloped in a liquid-tight material. During an electrochemical process that occurs when the strip gets exposed to the water in a situation of damage, the strip including the metal spiral dissolves and gas is developed. Some of this gas gets trapped in the loops/bends of the spiral, thereby interrupting the flow of electric current. When the current is restored for some reason, which may be a loss of gas, the process starts all over again and the loops/bends soon get filled with gas again. Thus, on the basis of relatively simple factors like a choice of material and a choice of geometry, it is achieved that the process is self-stopping.

The invention covers a method of designing an electric current supply system 20 that is to be at least partially submerged in an electrically conductive liquid and that comprises at least one electrically conductive component 21, 22, 23, 24, 25 enveloped in liquid-tight material 40, comprising steps of choosing sacrificial material in respect of the at least one electrically conductive component 21, 22, 23, 24, 25 that is capable of reacting electrochemically with the liquid in the event that the liquid-tight material 40 is damaged and the liquid is allowed to reach the at least one electrically conductive component 21, 22, 23, 24, 25, and determining a shape of at least one portion the at least one electrically conductive component 21, 22, 23, 24, 25 so as to let the sacrificial material that is present at the at least one portion occupy a space in the liquid-tight material 40 that is thereby defined with a shape that is suitable for trapping gas that is generated in the said event as the sacrificial material of the at least one electrically conductive component 21, 22, 23, 24, 25 disappears at the position where the sacrificial material reacts electrochemically with the liquid.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

In respect of the term "electric power source" as used in the present description and in the attached claims, it is noted that this term is to be understood so as to cover any device, system, arrangement, means etc. capable of providing the power that is needed for putting the electric current supply system 20 to an activated state, i.e. a state in which an electric potential difference is realized in the electric current supply system 20 so that electric current may flow through the electric current supply system 20. For example, the electric power source 30 may comprise a battery or the like, but may also comprise an arrangement for generating electric power on the basis of movement or temperature differences, for example. Further, it is noted that the electric current supply system 20 may be connected to an electric power source 30 in any possible suitable fashion, such as through a system of wires or in a wireless fashion. The word "connected" used here is to be understood so as to refer to an electric connection rather than a physical connection.

A possible summary of the invention reads as follows. An electric current supply system 20 is designed to be at least partially submerged in an electrically conductive liquid during operation thereof, and comprises at least one electrically conductive component 21, 22, 23, 24, 25 enveloped in liquid-tight material 40. The electrically conductive component 21, 22, 23, 24, 25 comprises sacrificial material that is capable of reacting electrochemically with the electrically conductive liquid in which the electric current supply system 20 is to be at least partially submerged. Further, the electrically conductive component 21, 22, 23, 24, 25 comprises at least one portion 50, 51 at which the sacrificial material occupies a space in the liquid-tight material 40 that is thereby defined with a gas trapping shape. If, in case of damage to the electric current supply system 20 in an actual submerged state thereof, the electrically conductive component 21, 22, 23, 24, 25 gets exposed to the electrically conductive liquid, it is achieved that an electrochemical reaction occurring at the exposed area of the electrically conductive component 21, 22, 23, 24, 25 and an outflow of electric current to the liquid are stopped under the influence of the same electric current as gas is formed in the electrochemical reaction that takes place under the influence of the electric current and trapped as an insulator between the electrically conductive component 21, 22, 23, 24, 25 and the electrically conductive liquid.

The invention claimed is:

1. An electric current supply system, partially submerged in an electrically conductive liquid during operation thereof, and comprising at least one electrically conductive component enveloped in liquid-tight material, wherein the at least one electrically conductive component comprises sacrificial material that is capable of reacting electrochemically with the liquid when the liquid-tight material is damaged and the liquid is allowed to reach the at least one electrically conductive component, and wherein the at least one electrically conductive component comprises at least one gas trap portion at which the sacrificial material occupies a space in the liquid-tight material defined with a shape that is designed for trapping gas that is generated in the said event as the sacrificial material of the at least one electrically conductive component disappears at the position where the sacrificial material reacts electrochemically with the liquid.

2. The electric current supply system according to claim 1, wherein the at least one electrically conductive component has an elongated shape, and wherein the at least one electrically conductive component comprises at least one gas trap portion that is at least partially loop-shaped.

3. The electric current supply system according to claim 2, wherein the at least one electrically conductive component has a superimposed bent shape at the position of the at least one gas trap portion.

4. The electric current supply system according to claim 2, wherein the at least one gas trap portion is a coil-shaped portion.

5. The electric current supply system according to claim 2, wherein the at least one gas trap portion comprises at least one U-shaped partial loop.

6. The electric current supply system according to claim 1, wherein the at least one electrically conductive component comprises at least one of aluminum, copper, iron, zinc and a metal alloy.

7. The electric current supply system according to claim 1, wherein a thickness of a flat shaped electric current supply system is in a range of 1 to 2 mm.

8. An electric device, designed to be at least partially submerged in an electrically conductive liquid during operation thereof, and comprising an electric current supply system according to claim 1 wherein at least one electric load is connected to the at least one electrically conductive component of the electric current supply system.

9. The electric device according to claim 8, wherein the at least one electric load comprises a light source that is configured to generate anti-fouling light.

10. The electric device according to claim 8, further comprising an electric power source connected to the at least one electrically conductive component of the electric current supply system.

11. The electric device according to claim 8, wherein a thickness of a flat shaped electric device being in a range of 1 to 2 mm.

12. An assembly of a marine object and the electric device according to claim 8, the marine object comprising at least one surface at least partially submersed in water containing biofouling organisms during at least a part of the lifetime of the marine object, and the electric device being arranged on the at least one surface.

13. A method of manufacturing an electric current supply system at least partially submerged in an electrically conductive liquid, comprising at least one electrically conductive component enveloped in liquid-tight material, wherein the at least one electrically conductive component comprising sacrificial material that is capable of reacting electrochemically with the liquid in the event that the liquid-tight material is damaged and the liquid is allowed to reach the at least one electrically conductive component, and the method comprising providing the at least one electrically conductive component with at least one gas trap portion at which the sacrificial material of the at least one electrically conductive component is configured to occupy a space in the liquid-tight material that is defined with a shape that is designed for trapping gas that is generated in the said event as the sacrificial material of the at least one electrically conductive component disappearing at the position where the sacrificial material reacts electrochemically with the liquid, and enveloping the at least one electrically conductive component in the liquid-tight material.

14. The method according to claim 13, wherein the at least one electrically conductive component is locally deformed prior to being enveloped in the liquid-tight material.

15. A method of reducing an outflow of electric current from an electric device comprising an electric current supply system and an electric power source, the electric current supply system comprising at least one electrically conductive component connected to the electric power source and enveloped in liquid-tight material, the outflow of electric current from the electric device occurring in the event that the electric current supply system is at least partially submerged in an electrically conductive liquid and the liquid-tight material is damaged so that the liquid is allowed to reach the at least one electrically conductive component, the at least one electrically conductive component comprising sacrificial material that is capable of reacting electrochemically with the liquid, and the method comprising:

enabling an electrochemical reaction of the sacrificial material of the at least one electrically conductive component with the liquid by continuing a supply of electric current from the electric power source to the at least one electrically conductive component, and trapping gas that is generated in the electrochemical reaction in a space that is obtained in the liquid-tight material as the sacrificial material of the at least one electrically conductive component disappearing at the position where the electrochemical reaction takes place.

* * * * *